US012589639B2

(12) United States Patent (10) Patent No.: US 12,589,639 B2
Choi et al. (45) Date of Patent: Mar. 31, 2026

(54) VEHICLE BODY FRAME

(71) Applicants:Hyundai Motor Company, Seoul (KR); Kia Corporation, Seoul (KR)

(72) Inventors: Ki Hyun Choi, Yongin-Si (KR); Ji Hyun Song, Suwon-Si (KR); Hyung Sik Choi, Seoul (KR); Sun In You, Yesan-Eup (KR); Sang Heon Lee, Seoul (KR); Jin Ho Hwang, Cheonan-Si (KR); Dong Eun Cha, Hwaseong-Si (KR); Won Chan Lee, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 461 days.

(21) Appl. No.: 18/134,452

(22) Filed: Apr. 13, 2023

(65) Prior Publication Data

US 2024/0131910 A1 Apr. 25, 2024
US 2024/0227524 A9 Jul. 11, 2024

(30) Foreign Application Priority Data

Oct. 24, 2022 (KR) ......................... 10-2022-0137540

(51) Int. Cl.
B60J 7/16 (2006.01)
B62D 31/00 (2006.01)
(52) U.S. Cl.
CPC ............ B60J 7/165 (2013.01); B62D 31/006 (2013.01)
(58) Field of Classification Search
CPC ...... B60P 3/34; B60P 3/341; B60J 5/06; B60J 5/047; B60J 7/165; B60J 7/024; B62D 31/006

USPC .......................................................... 280/638
See application file for complete search history.

(56) References Cited

U.S. PATENT DOCUMENTS 3,356,410 A * 12/1967 Taylor ....................... B60P 3/34
296/173
3,966,250 A * 6/1976 Winskas ................... B60P 3/34
296/10
5,028,088 A * 7/1991 Del Monico ............. B60P 3/34
296/26.04

(Continued)

FOREIGN PATENT DOCUMENTS

DE 102017011996 B3 3/2019
JP 3192531 7/2001

(Continued)

*Primary Examiner* — James A Shriver, II
*Assistant Examiner* — Hilary L Johns
(74) *Attorney, Agent, or Firm* — MORGAN, LEWIS & BOCKIUS LLP

(57) ABSTRACT

A vehicle body frame includes a lower frame fixed to a floor of a vehicle to define a lower region of an internal space in the vehicle, a roof frame connected to an upper portion of the lower frame to define an upper region of the internal space, configured to slid in a vertical direction of the vehicle with respect to the lower frame, to expand the internal space upwards when the roof frame slides upwards, a lower door frame forming a lower portion of a vehicle door, and an upper door frame connected to the lower door frame to form an upper portion of the vehicle door, and configured to slid together with the roof frame to expand the vehicle door upwards when the roof frame slides upwards.

20 Claims, 15 Drawing Sheets

(56) References Cited

U.S. PATENT DOCUMENTS

| | | | | |
|---|---|---|---|---|
| 5,374,094 A * | 12/1994 | Smith | ........................ | B60P 3/34 |
| | | | | 296/26.05 |
| 6,467,830 B1 * | 10/2002 | Cortright | ................ | B60R 13/06 |
| | | | | 296/26.05 |
| 10,343,586 B2 * | 7/2019 | Stoetzl | .................... | B60P 3/341 |
| 11,230,170 B2 * | 1/2022 | Ravestein | ................ | B60J 5/047 |
| 11,357,361 B1 * | 6/2022 | Wright | ................. | E04H 1/1216 |
| 12,365,280 B2 * | 7/2025 | Hsu | ......................... | B60P 3/341 |
| 2008/0164721 A1 * | 7/2008 | Semotuk | ................... | B60P 3/34 |
| | | | | 296/165 |
| 2013/0062900 A1 * | 3/2013 | Bullard | .................... | B60P 3/34 |
| | | | | 296/26.04 |
| 2018/0072214 A1 * | 3/2018 | Stoetzl | .................... | B60J 7/024 |
| 2022/0305978 A1 * | 9/2022 | Marqueton | .............. | B60P 3/34 |

FOREIGN PATENT DOCUMENTS

| | | |
|---|---|---|
| KR | 20-1998-0045727 U | 9/1998 |
| KR | 10-1807203 | 12/2017 |
| KR | 10-2018-0100921 | 9/2018 |
| KR | 10-2369339 | 3/2022 |

* cited by examiner 310   330

340

[SECTION A-A]

350   320   120   360

[SECTION B-B]

[SECTION C-C]

220

360

[SECTION D-D]

210

360

[SECTION E-E]

[SECTION F-F]

[SECTION G-G: BEFORE EXPANSION]

[SECTION G-G: AFTER EXPANSION]

[SECTION H–H]

VEHICLE BODY FRAME

CROSS-REFERENCE TO RELATED APPLICATION

The present application claims priority to Korean Patent Application No. 10-2022-0137540, filed on Oct. 24, 2022, the entire contents of which is incorporated herein for all purposes by this reference.

BACKGROUND OF THE PRESENT DISCLOSURE

Field of the Present Disclosure

The present disclosure relates to a vehicle body frame, and more particularly, to a vehicle body frame which slides in the vertical direction to expand the internal space and a door of a vehicle when the vehicle is connected to a building.

Description of Related Art

As interest in electric vehicles and autonomous vehicles is increasing recently, various purposes and shapes of vehicles are being developed now. In an autonomous vehicle, a passenger in the internal space of the vehicle may behave freely, and thus, connectivity of the vehicle to various different environments becomes important.

Therefore, when the vehicle is connected to a building to be connected to a living space, a concept that utilizes the internal space of the vehicle as a space expanding from the living space may be considered.

However, the overall height of the building, such as a house, is greater than that of the vehicle, and thus, it is inconvenient for the passenger to move from the vehicle to the building or from the building to the vehicle. Furthermore, the overall height of the vehicle is low, and thus, the passenger is not capable of standing properly in the internal space of the vehicle.

Therefore, a way to facilitate movement of a passenger between a vehicle and a building and to expand the internal space of the vehicle when the vehicle is connected to the building is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle body frame which slides in the vertical direction to expand the internal space and door of a vehicle when the vehicle is connected to a building, and may thus increase passenger convenience in entering and exiting the vehicle and passenger convenience in movement between the vehicle and the building.

In accordance with various aspects of the present disclosure, the above and other objects may be accomplished by the provision of a vehicle body frame including a lower frame fixed to a floor of a vehicle to define a lower region of an internal space in the vehicle, a roof frame connected to an upper portion of the lower frame to define an upper region of the internal space, configured to slid in a vertical direction of the vehicle with respect to the lower frame, to expand the internal space in a first direction when the roof frame slides in the first direction, a lower door frame forming a lower portion of a vehicle door, and an upper door frame connected to the lower door frame to form an upper portion of the vehicle door, and configured to slid together with the roof frame to expand the vehicle door in the first direction when the roof frame slides in the first direction.

The roof frame may be slidably inserted into the lower frame to reduce the internal space, when the roof frame slides in a second direction.

The upper door frame may be slidably inserted into the lower frame to reduce the internal space, when the upper door frame slides in the second direction.

The lower door frame and the upper door frame may be provided on a side surface of the vehicle.

The vehicle body frame may further include an external door portion forming an external surface of the vehicle door, and provided outside the lower door frame and the upper door frame, and an internal door portion forming an internal surface of the vehicle door, and provided to surround the lower door frame and the upper door frame, and the external door portion and the internal door portion may be spaced from each other by a predetermined interval in a width direction of the vehicle.

The external door portion may be elevated in a fixed state of the internal door portion, when the roof frame and the upper door frame are slid in the first direction.

The internal door portion may be exposed outside and thus forms the external surface of the vehicle door, when the external door portion is elevated.

The lower frame may be connected to the internal door portion through hinges to be fixed.

The hinges may be formed in a shape configured to extend while being bent in an inward direction of the vehicle.

The vehicle body frame may further include a side glass provided beside the external door portion to form the external surface of the vehicle, and the side glass may be connected to the roof frame in the upper region of the internal space.

A gap between the internal door portion and the floor in the lower region of the internal space may be sealed by a weather strip.

A gap between the roof frame and the external door portion in the upper region of the internal space may be sealed by a weather strip.

The roof frame may be connected to the upper door frame by hinges to be slid together with the upper door frame.

The lower frame may be connected to the lower door frame by hinges to be fixed.

The lower door frame may be connected to the internal door portion by welding.

The vehicle body frame may further include a bidirectional hydraulic cylinder inserted into a lower end portion of the lower frame, and the bidirectional hydraulic cylinder may slide the roof frame in the vertical direction with respect to the lower frame.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
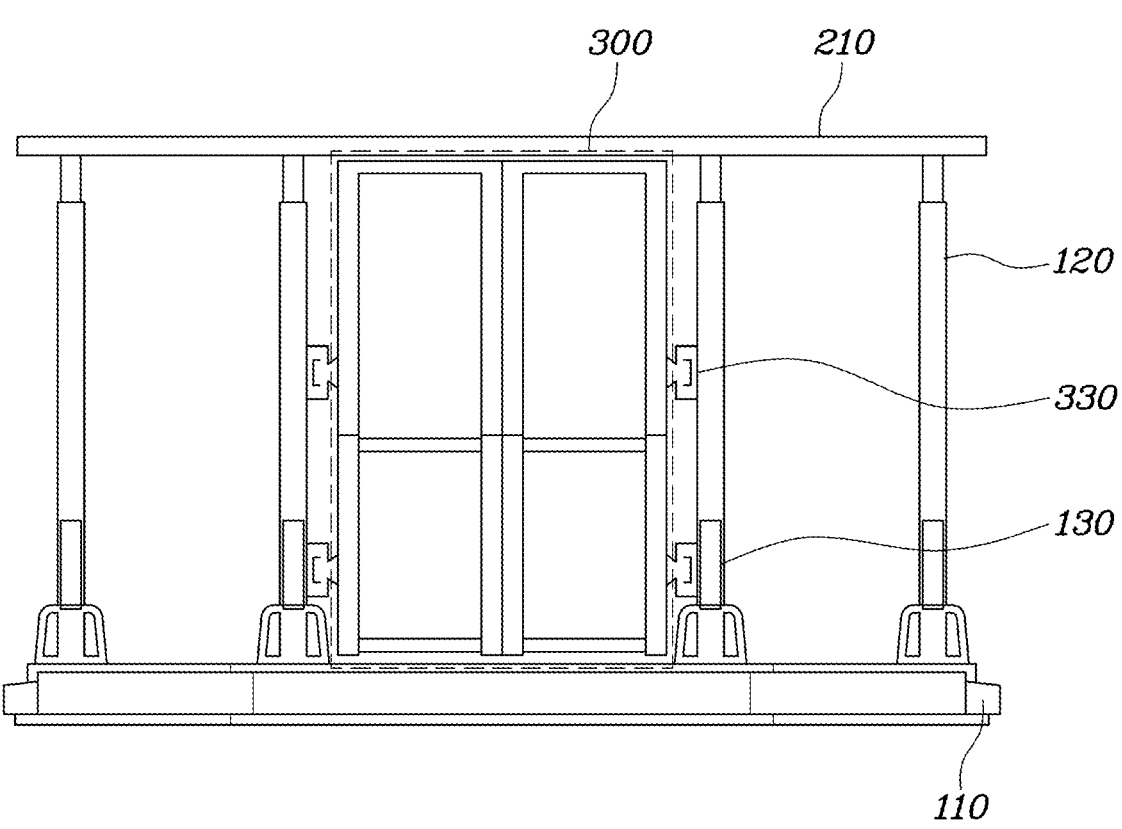
FIG. 1 is a view showing a vehicle body frame according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to exemplary embodiments of the present disclosure, examples of which are illustrated in the accompanying drawings. Wherever possible, the same reference numbers will be used throughout the drawings to refer to the same or like parts.

In the following description of the embodiments, suffixes, such as "module", "part" and "unit", are provided or used interchangeably merely in consideration of ease in statement of the specification, and do not have meanings or functions distinguished from one another.

In the following description of the exemplary embodiments of the present disclosure, a detailed description of known functions and configurations incorporated herein will be omitted when it may make the subject matter of the present disclosure rather unclear. Furthermore, the accompanying drawings will be exemplarily provided to describe the exemplary embodiments of the present disclosure, and should not be construed as being limited to the exemplary embodiments set forth herein, and it will be understood that the exemplary embodiments of the present disclosure are provided only to completely disclose the present disclosure and cover modifications, equivalents or alternatives which come within the scope and technical range of the present disclosure. In the following description of the embodiments, terms, such as "first" and "second", are used only to describe various elements, and these elements should not be construed as being limited by these terms. These terms are used only to distinguish one element from other elements.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present.

As used herein, singular forms may be intended to include plural forms as well, unless the context clearly indicates otherwise.

In the following description of the embodiments, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

An exemplary embodiment of the present disclosure is directed to providing a vehicle body frame which is slid in the vertical direction to expand the internal space and door of a vehicle when the vehicle is connected to a building.

Figure 2:
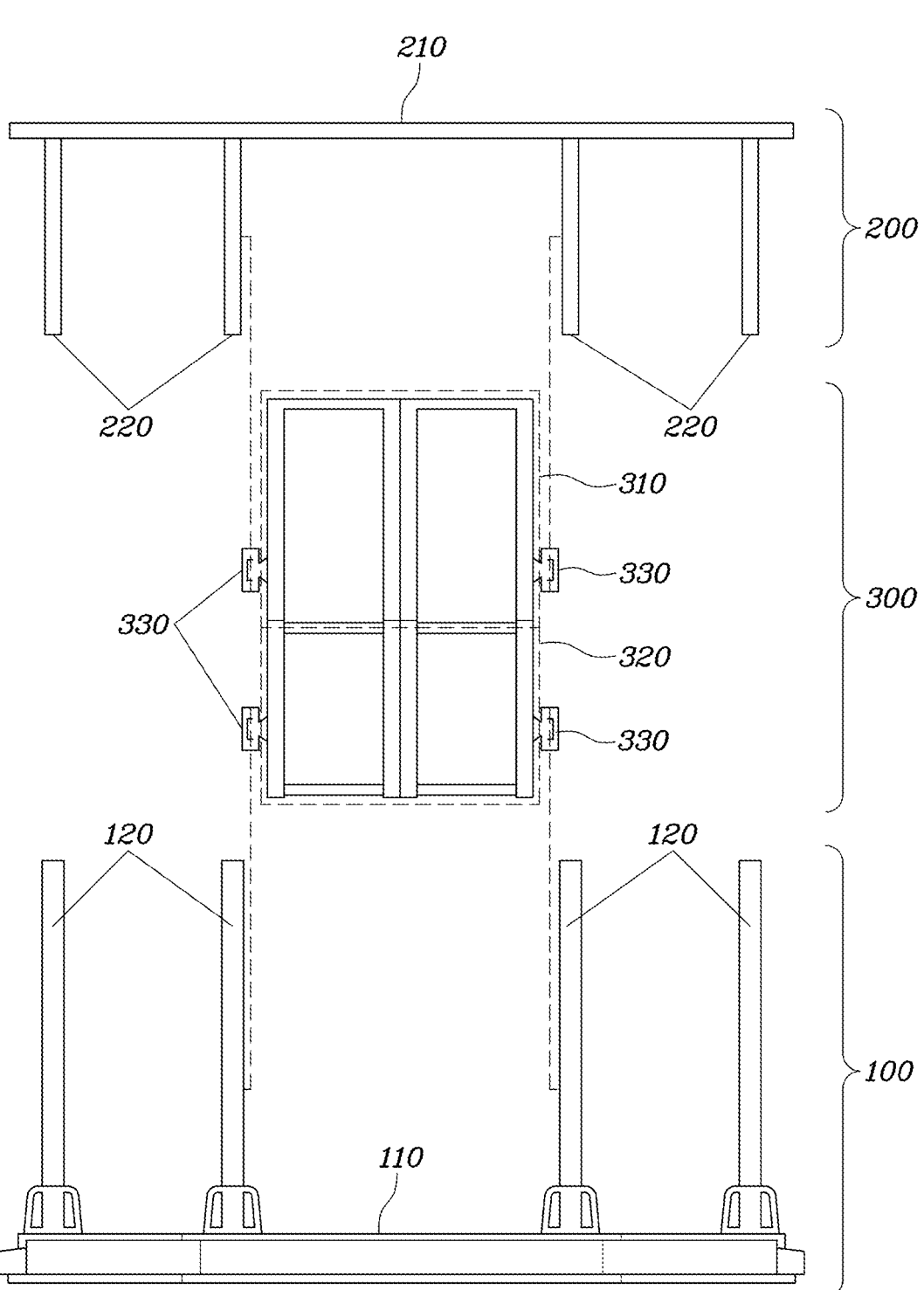
FIG. 2 is a view showing the configuration of the vehicle body frame according to an exemplary embodiment of the present disclosure.

FIG. 1 and FIG. 2 are views showing a vehicle body frame according to various exemplary embodiments of the present disclosure and the configuration thereof in the state in which the internal space and door of a vehicle are expanded upwards, respectively.

FIG. 1 and FIG. 2 mainly illustrate elements related to the exemplary embodiment of the present disclosure, and an actual vehicle body frame may include a larger number or a smaller number of elements.

Referring to FIG. 1 and FIG. 2, the vehicle body frame of a vehicle 400 according to various exemplary embodiments of the present disclosure may include a lower frame 100, a roof frame 200, and a door frame 300.

The lower frame 100 may be fixed to a floor 110 of the vehicle 400, and may define the lower region of the internal space of the vehicle 400. The floor 110 of the vehicle 400 may be disposed in the longitudinal direction of the vehicle 400, and may support the load of the vehicle 400. A plurality of fixed rails 120, which forms the lower frame 100, may be disposed on the floor 110 in a direction orthogonal to the floor 110, and may be configured so that a plurality of operating rails 220, which will be described later, slides upwards in the fixed rails 120. The door frame 300 may be disposed between two fixed rails 120 which are located in the middle from among the plurality of fixed rails 120, and may thus serve as a door of the vehicle 400.

The roof frame 200 may be connected to the upper portion of the lower frame 100 to define the upper region of the internal space of the vehicle 400, and may be slid in the vertical direction with respect to the lower frame 100. The roof frame 200 may include a roof rail 210 disposed on the upper portion of the vehicle 400 in the longitudinal direction of the vehicle 400, and the plurality of operating rails 220 disposed in a direction orthogonal to the roof rail 210. The operating rails 220 may be slid in the fixed rails 120 of the lower frame 100, and when the operating rails 220 are slid upwards, the internal space of the vehicle 400 may be expanded upwards. On the other hand, when the operating rails 220 are slid downwards in the fixed rails 220, the operating rails 220 are inserted into the lower frame 100 and accordingly, the internal space of the vehicle 400 may be reduced.

The door frame 300 may be divided into a lower door frame 320 and an upper door frame 310. The lower door frame 320 may form the lower portion of the door of the vehicle 400, and the upper door frame 310 may be connected to the lower door frame 320 and may form the upper portion of the door of the vehicle 400. The upper door frame 310 may be slid together with the roof frame 200 to expand the door of the vehicle 400 upwards when the roof frame 200 slides upwards, and may be slid together with the roof frame 200 and thus be inserted into the lower door frame 320 to reduce the internal space of the vehicle 400 when the roof frame 200 is slid downwards. The door frame 300 including the lower door frame 320 and the upper door frame 310 may be provided on a side surface of the vehicle 400 to form the door of the vehicle 400, and may be configured so that the center portion of the door frame 300 may be opened or closed and thus a passenger may enter or exit the vehicle 400 through the door of the vehicle 400.

Furthermore, as shown in FIG. 1, the roof frame 200 may be slid in the vertical direction through bidirectional hydraulic cylinders 130 respectively inserted into the lower end portions of the fixed rails 120. The internal space of the vehicle 400 is expanded upwards by the sliding of the roof frame 200 in the vertical direction, and the door of the vehicle 400 is also expanded upwards by the sliding of the upper door frame 310 together with the roof frame 200.

The roof frame 200 and the upper door frame 310 are connected to each other by hinges 330 so that the roof frame 200 and the upper door frame 310 may be slid together, and this will be described later.

Figure 3:
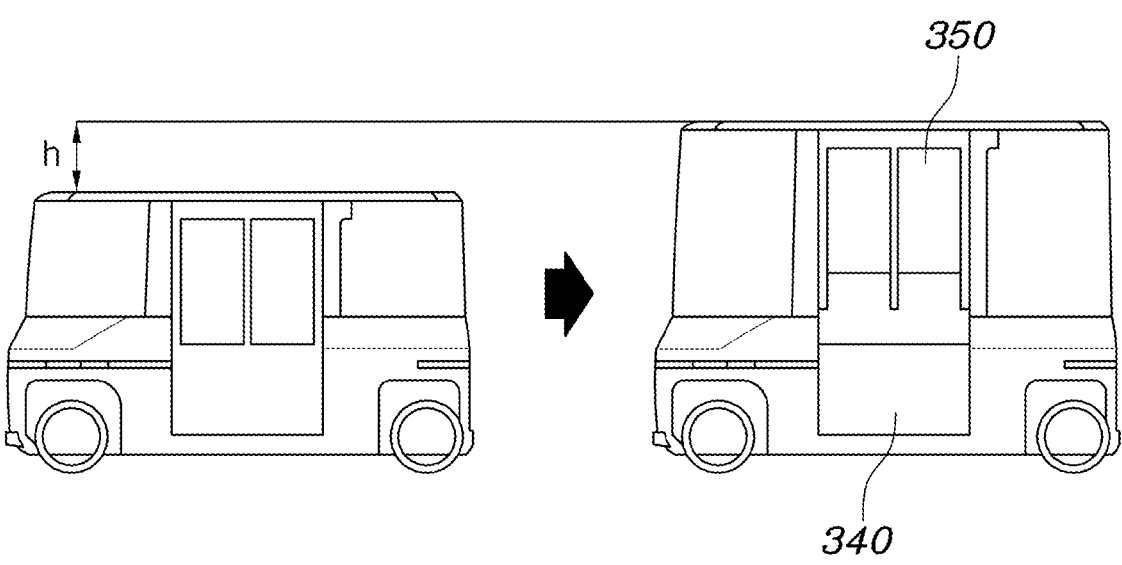
FIG. 3 is a view showing the states of a vehicle according to various exemplary embodiments of the present disclosure before and after a process of expanding the internal space of the vehicle upwards.

FIG. 3 is a view showing the states of the vehicle 400 according to various exemplary embodiments of the present disclosure before and after the process of expanding the internal space of the vehicle 400 upwards.

Figure 5:
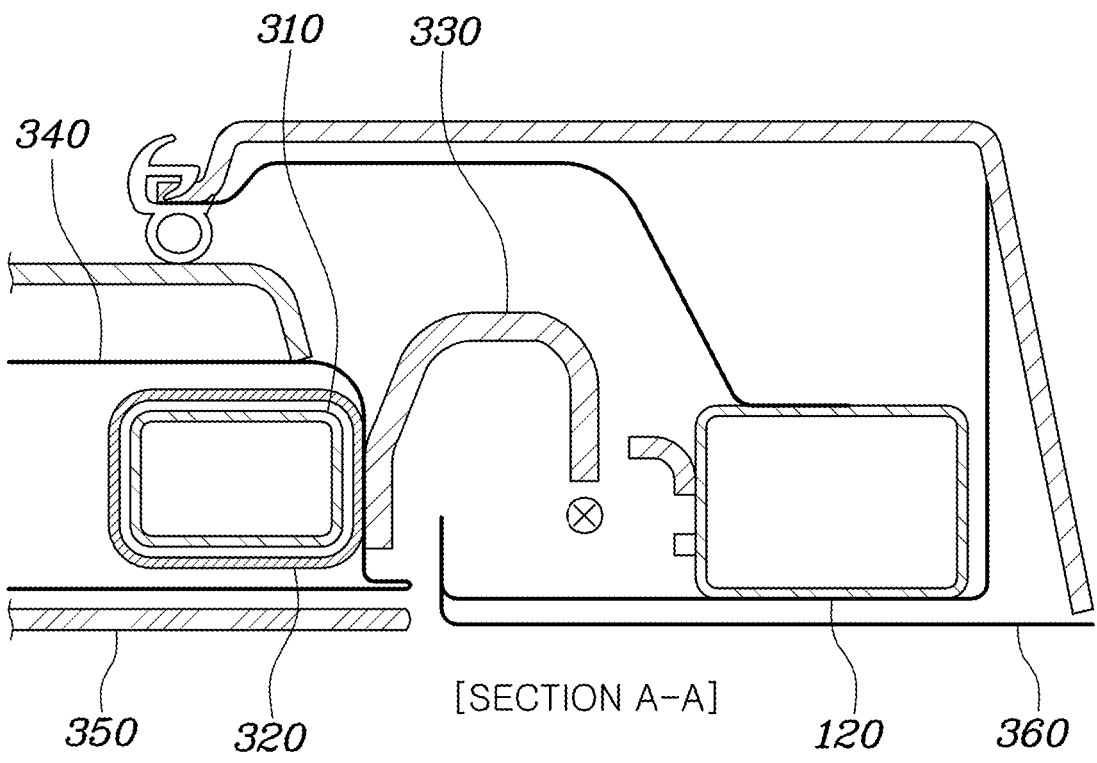
FIG. 5, FIG. 6 and FIG. 7 are cross-sectional views of the vehicle, taken along lines A-A, B-B and C-C of FIG. 4, respectively.

Referring to FIG. 3, as the entirety of the upper portion of the vehicle 400 is raised to a height h in the state in which the lower portion of the vehicle 400 is fixed, the internal space of the vehicle 400 may be expanded upwards. Here, as shown in the right side of the FIG. 3, the door may include an internal door portion 340 and an external door portion 350. The internal door portion 340 may form the internal surface of the door at the lower portion of the vehicle 400, and may be formed to surround the lower door frame 320 and the upper door frame 310, as shown in FIG. 5. The external door portion 350 may form the external surface of the door, and may be provided outside the lower door frame 320 and the upper door frame 310. The external door portion 350 is coupled to the operating rails 220 of the roof frame 200, and may be slid together with the roof frame 200 when the roof frame 200 is slid upwards. Furthermore, the external door portion 350 may be formed of glass to obtain external visibility for passengers.

Figure 4:
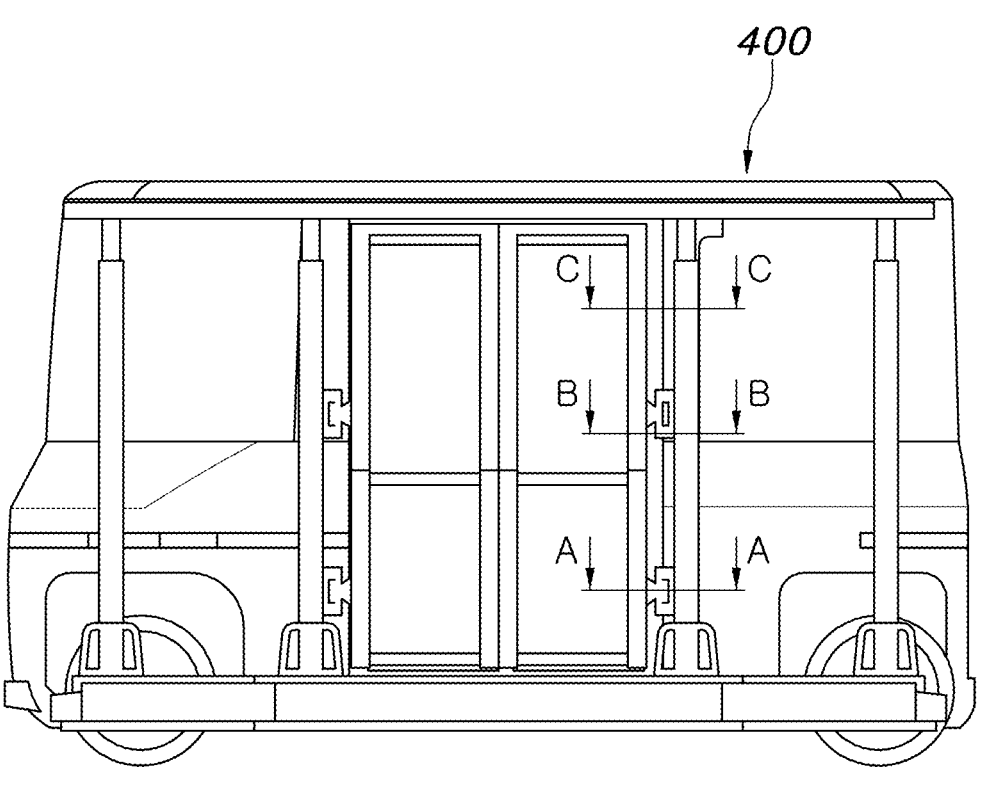
FIG. 4 is a schematic view of the vehicle according to an exemplary embodiment of the present disclosure.
Figure 6:
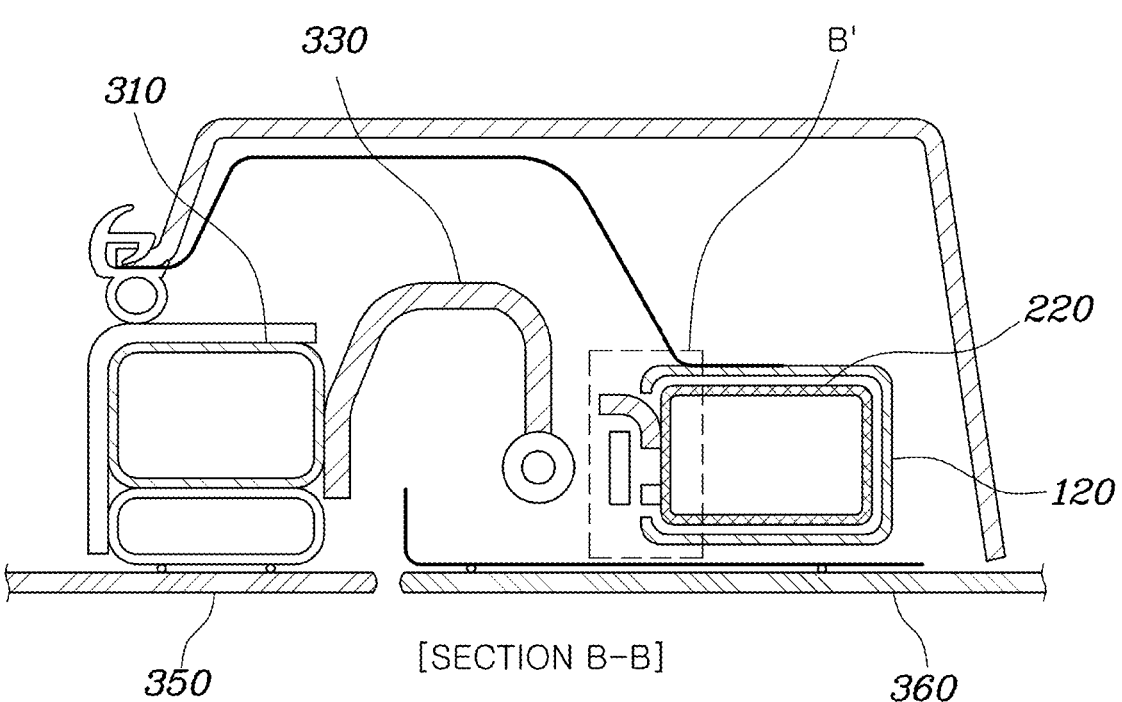
Figure 7:
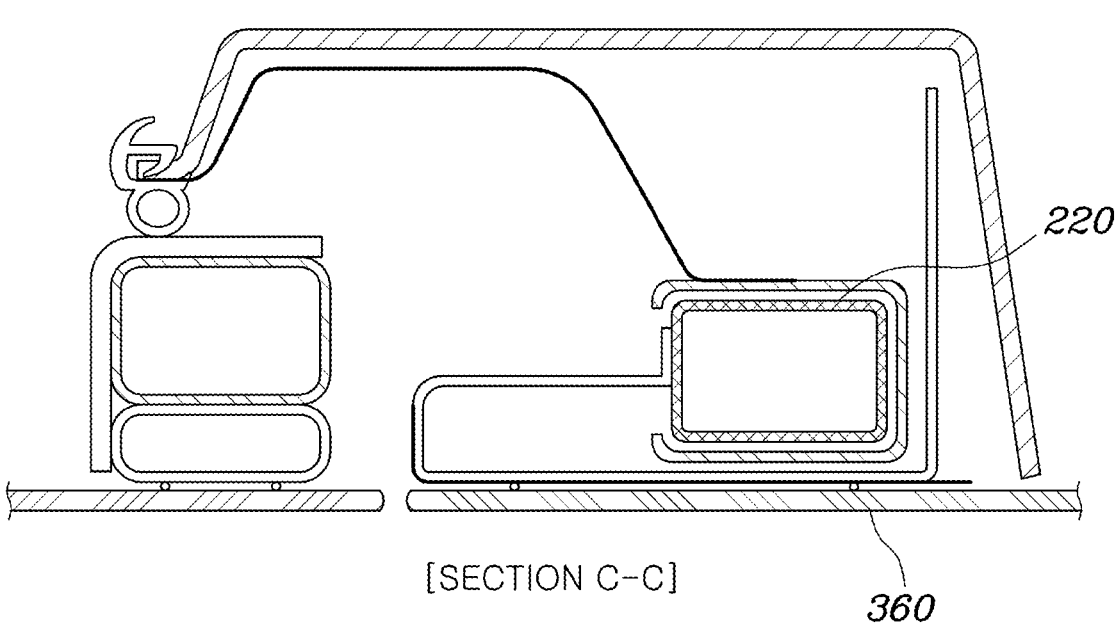

FIG. 4 is a schematic view of the vehicle 400 according to various exemplary embodiments of the present disclosure, and FIG. 5, FIG. 6 and FIG. 7 are cross-sectional views of the vehicle 400, taken along lines A-A, B-B and C-C of FIG. 4, respectively.

Referring to FIG. 5, which is the cross-sectional view of the vehicle 400, taken along line A-A of FIG. 4, a side glass 360 may be provided beside the external door portion 350, may be formed of glass in the same manner as the external door portion 350, and may formed to the external surface of the vehicle 400. The fixed rails 120 may be coupled to the side glass 360 to increase robustness of the side glass 360. Furthermore, when the lower door frame 320 is coupled to the internal door portion 340, the hinges 330 may connect the fixed rails 120 to the internal door portion 340 to fix the fixed rails 120 and the internal door portion 340 to each other. Here, the lower frame 100 may be fixed to the lower door frame 320 by hinges 330, being configured for increasing robustness of the vehicle body frame when the vehicle body frame is slid in the vertical direction thereof.

Here, the hinges 330 may be formed in a shape which extends while being bent in the inward direction of the vehicle 400, and may increase a coupling area between the internal door portion 340 and the lower door frame 320 and a coupling area between the roof frame 200 and the upper door frame 310 to more stably couple the internal door portion 340 and the lower door frame 320 to each other and couple the roof frame 200 and the upper door frame 310 to each other. To slide the external door portion 350 together with the roof frame 200 when the roof frame 200 is slid upwards, the external door portion 350 and the internal door portion 340 may be spaced from each other by a designated interval in the width direction of the vehicle 400 so that the external door portion 350 is not coupled to the internal door portion 340.

Referring to FIG. 6, which is the cross-sectional view of the vehicle 400, taken along line B-B of FIG. 4, the external door portion 350 may be coupled to the upper door frame 310, and may be formed to allow the operating rails 220 of the roof frame 200 to be elevated in the state in which operating rails 220 are inserted into the fixed rails 220 of the lower frame 100. A structure, in which the roof frame 200 is inserted into the lower frame 100 to increase an overlapping area between the roof frame 200 and the lower frame 100, is most preferable to facilitate expansion and reduction of the internal space of the vehicle 400. As shown in an area B', the side surfaces of the fixed rails 120 may be partially cut to fix the operating rails 220 and the upper door frame 310. Referring to FIG. 7, which is the cross-sectional view of the vehicle, taken along line C-C of FIG. 4, the operating rails 220 of the roof frame 200 may be connected to the side glass 360 in areas in which the hinges 330 are not provided.

As described above, the internal door portion 340 fixed to the vehicle 400 and the lower door frame 320 may be coupled to each other and the roof frame 200 and the upper door frame 310 may be coupled to each other through the hinges 330, allowing the upper door frame 310 to be slid together with the roof frame 200 when the roof frame 200 is slid upwards.

Figure 8:
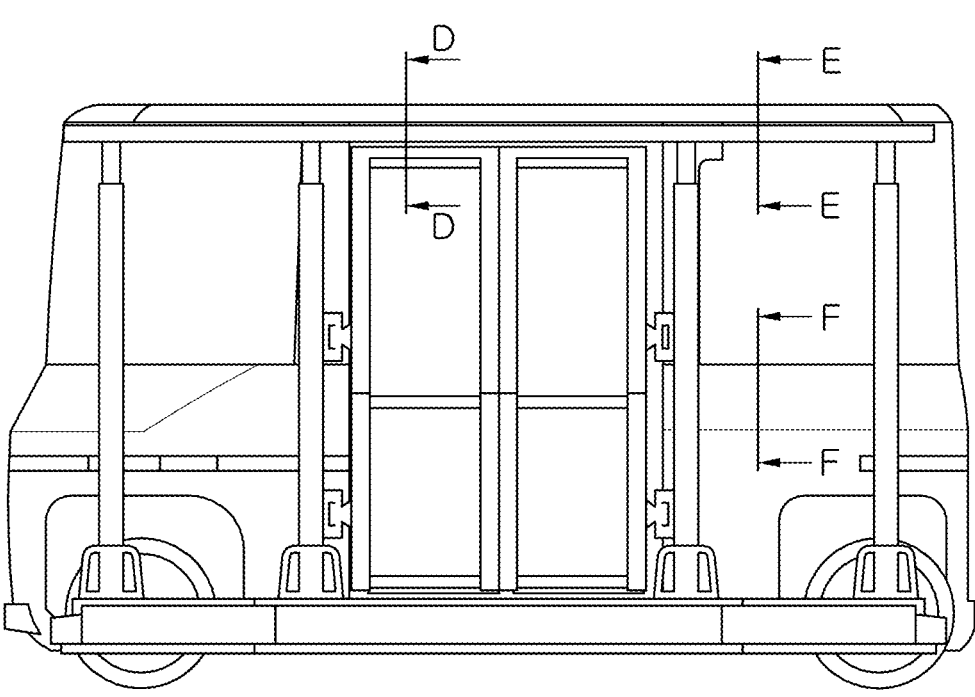
FIG. 8 is a schematic view of the vehicle according to an exemplary embodiment of the present disclosure.
Figure 9:
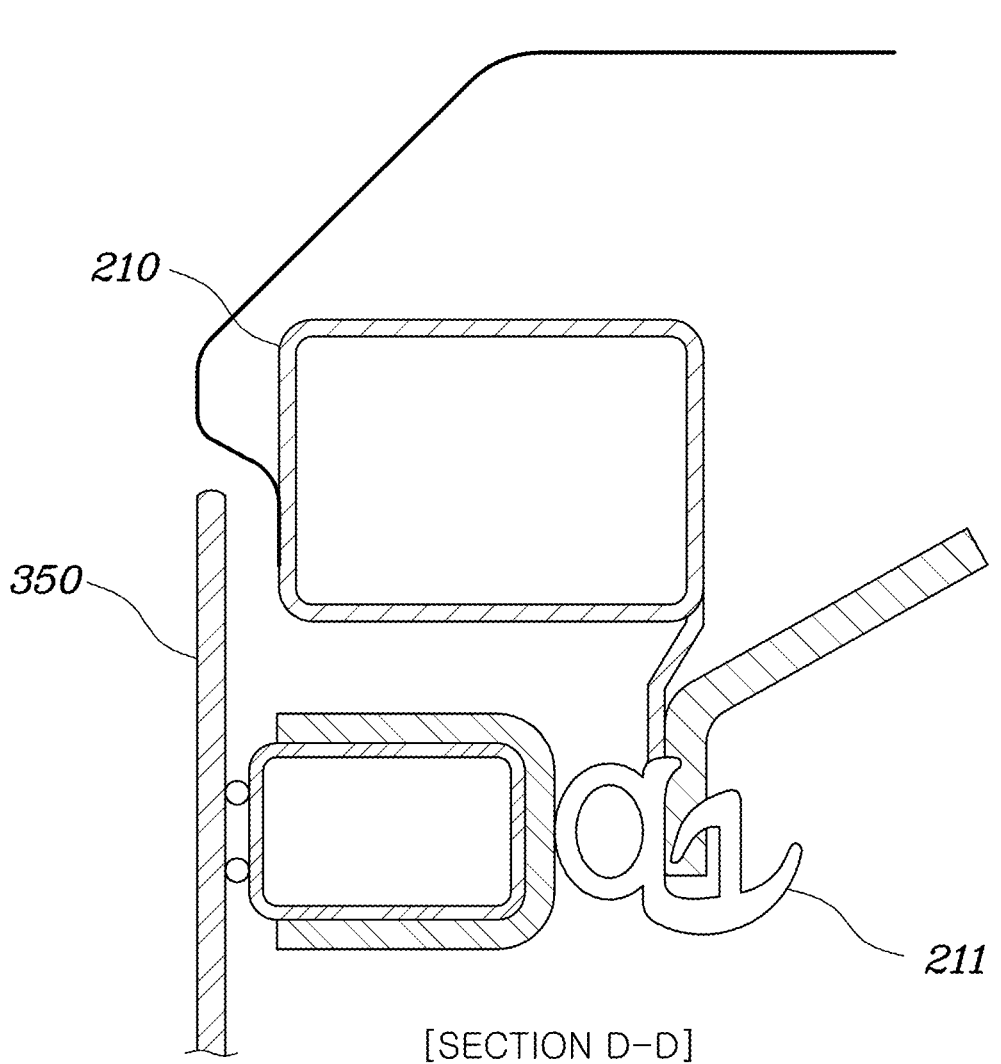
FIG. 9, FIG. 10 and FIG. 11 are longitudinal-sectional views of the vehicle, taken along lines D-D, E-E and F-F of FIG. 8, respectively.
Figure 10:
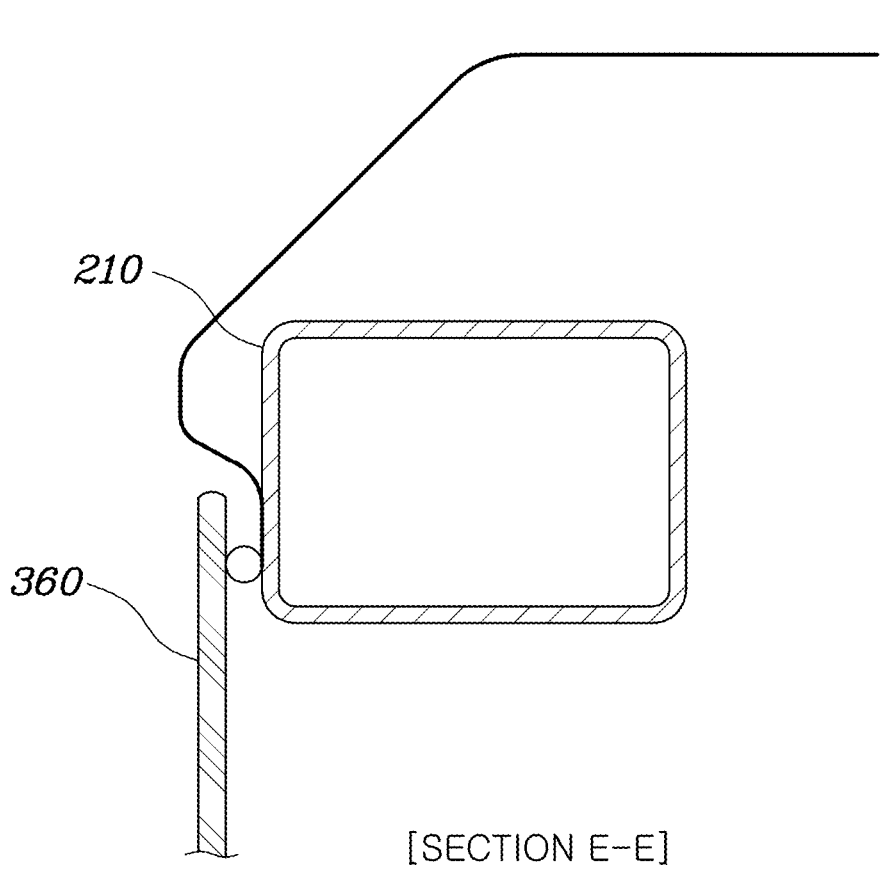
Figure 11:
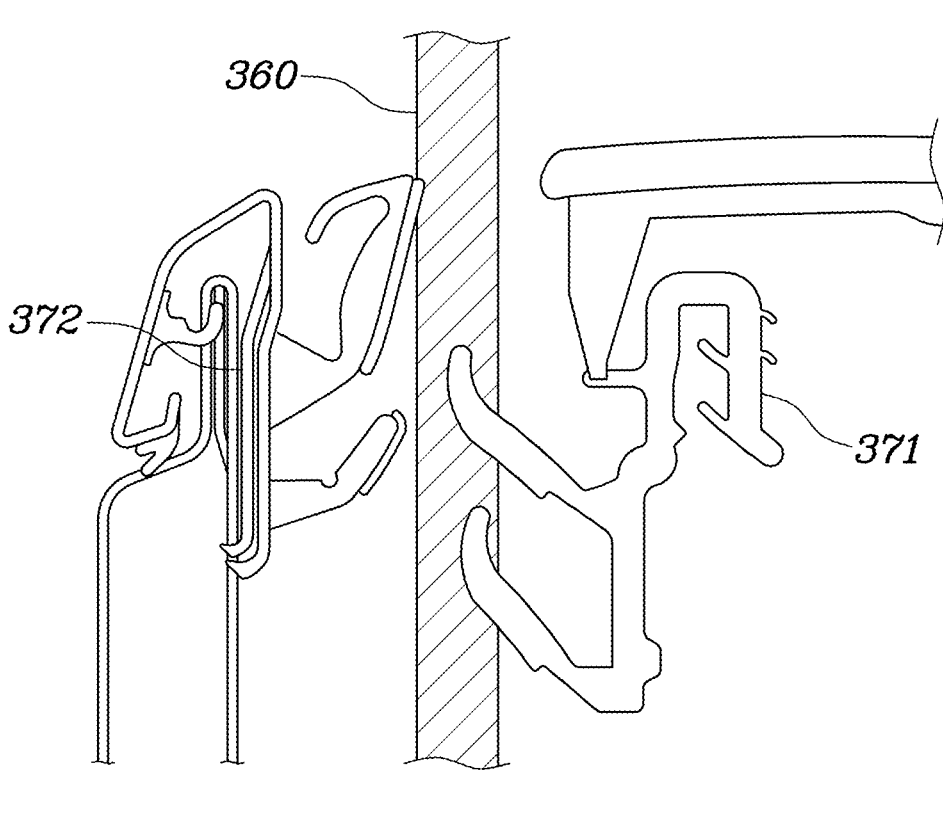

FIG. 8 is a schematic view of the vehicle 400 according to various exemplary embodiments of the present disclosure, and FIG. 9, FIG. 10 and FIG. 11 are longitudinal-sectional views of the vehicle 400, taken along lines D-D, E-E and F-F of FIG. 8, respectively.

Referring to FIG. 9, which is the longitudinal-sectional view of the vehicle 400, taken along line D-D, the roof rail 210 and the external door portion 350 may be separated from each other in the upper region of the internal space, and a weather strip 211 may be provided on the roof rail 210 to seal the roof rail 210 and the external door portion 350 in such a space in which the roof rail 210 and the external door portion 350 are separated from each other. Furthermore, the external door portion 350 may be coupled to the upper door frame 310, and thus, the external door portion 350 may be slid upwards together with the upper door frame 310 when the upper door frame 310 is slid upwards. Referring to FIG. 10, which is the longitudinal-sectional view of the vehicle 400, taken along line E-E, the side glass 360 may be configured to be connected to the roof rail 210 in the upper region of the internal space. Accordingly, a portion of the vehicle frame body, which is not slid in the vertical direction, beside the external door portion 350 may secure coupling stability and frame robustness.

Furthermore, because the internal space of the vehicle 400 is expanded as the roof frame 200 slides upwards, an indoor belt 371 and an outdoor belt 372 may be disposed to surround the side glass 360, as shown in FIG. 11 which is the longitudinal-sectional view of the vehicle 400, taken along line F-F.

Figure 12:
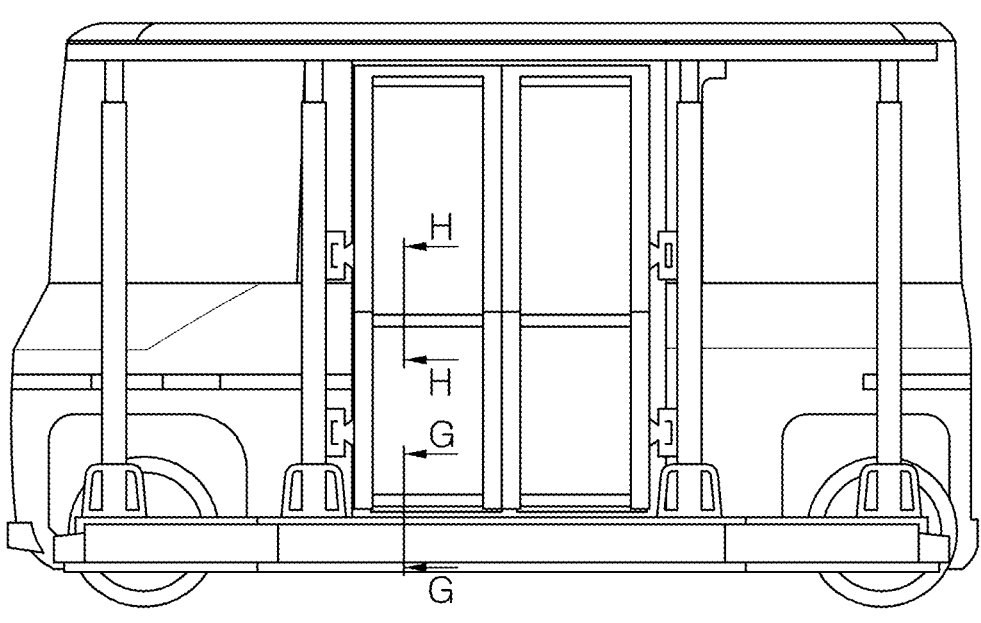
FIG. 12 is a schematic view of the vehicle according to an exemplary embodiment of the present disclosure.
Figure 13:
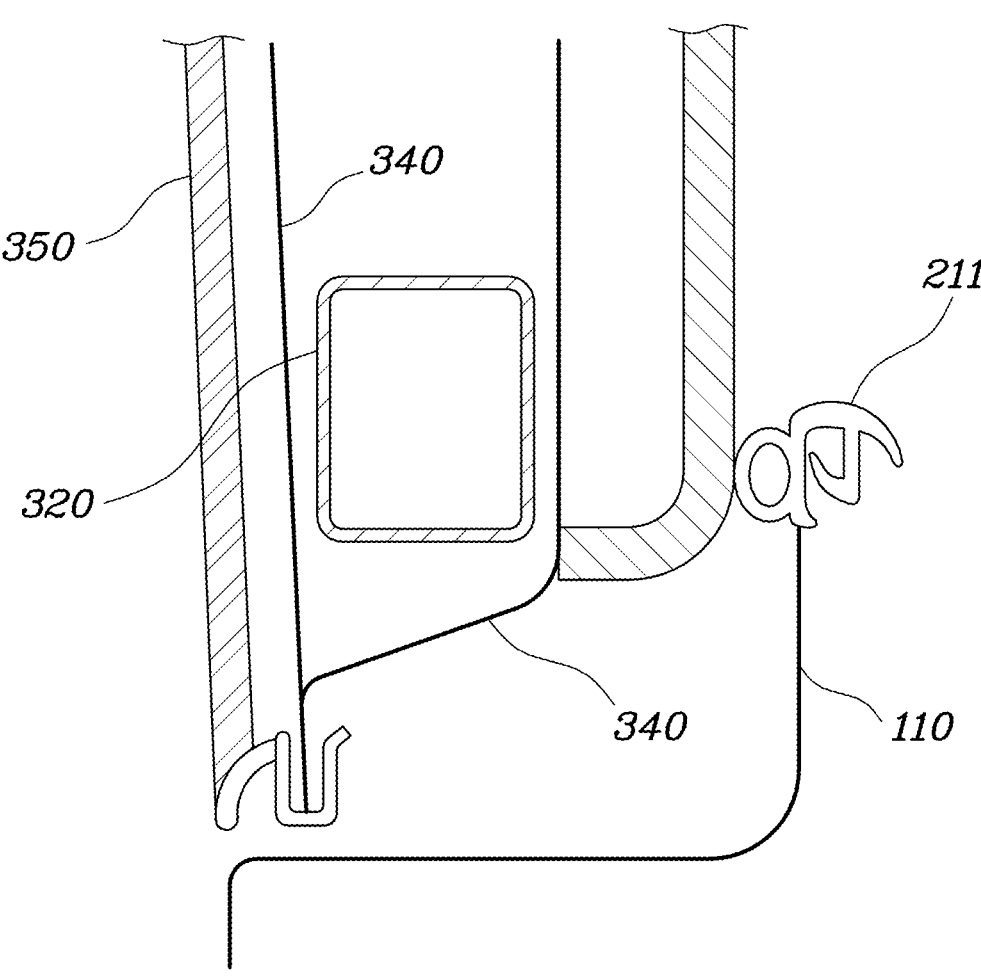
FIG. 13, FIG. 14 and FIG. 15 are longitudinal-sectional views of the vehicle, taken along lines G-G and H-H of FIG. 12.
Figure 14:
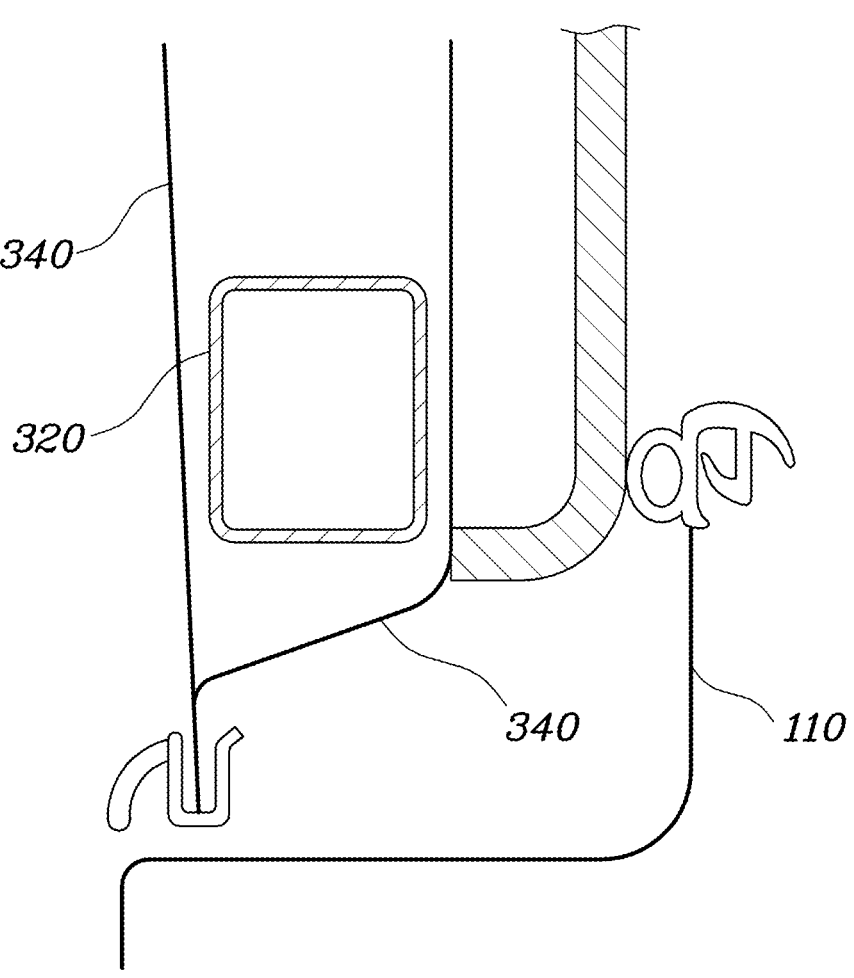
Figure 15:
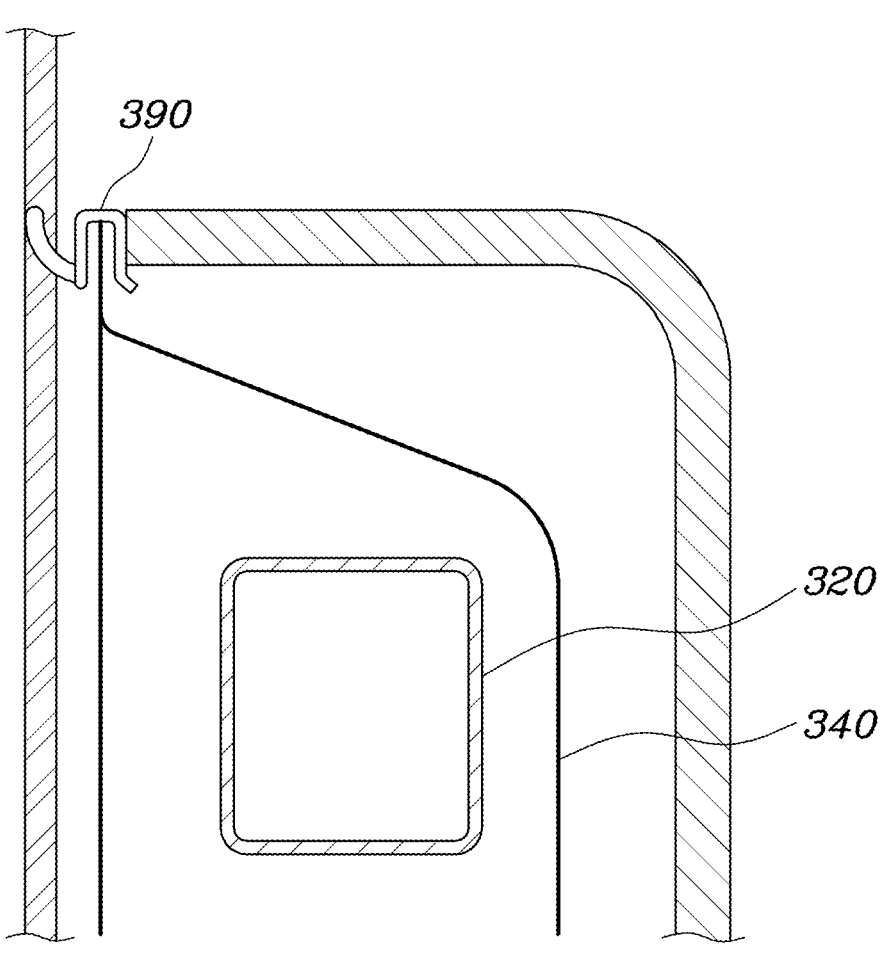

FIG. 12 is a schematic view of the vehicle 400 according to various exemplary embodiments of the present disclosure, and FIG. 13, FIG. 14 and FIG. 15 are longitudinal-sectional views of the vehicle 400, taken along lines G-G and H-H of FIG. 12. FIG. 13 and FIG. 14 are the longitudinal-sectional views of the vehicle 400, taken along line G-G, before and after expansion of the internal space of the vehicle, respectively. A gap between the internal door portion 340 and the floor 110 may be sealed by a weather strip 211, and may thus secure airtightness. Furthermore, when the roof frame 200 and the upper door frame 310 are slid upwards and elevated, the external door portion 350 is slid upwards together with the upper door frame 310. Here, the internal door portion 340 is fixed to the lower portion of the internal space, and thus, when the external door portion 350 slides upwards, the internal door portion 340 is exposed to the outside. Therefore, the internal door portion 340 forms the external surface of the door after the external door portion 350 has been slid upwards and elevated. Referring to FIG. 15, which is the longitudinal-sectional view of the vehicle 400, taken along line H-H, coupling force between the lower door frame 320 and the internal door portion 340 may be increased by connecting the lower door frame 340 to the internal door portion 340 by welding. Furthermore, a parting seal 390 may be coupled to the internal door portion 340 in the lower region of the internal space of the vehicle 400 to seal the interior of the vehicle 400 from, the outside thereof, being configured for securing airtightness of the interior of the vehicle 400.

Consequently, the vehicle body frame according to an exemplary embodiment of the present disclosure is slid in the vertical direction to expand the internal space and door of the vehicle when the vehicle is connected to the building, and may thus increase passenger convenience in entering and exiting the vehicle and passenger convenience in movement between the vehicle and the building.

As is apparent from the above description, a vehicle body frame according to an exemplary embodiment of the present disclosure is slid in the vertical direction to expand the internal space and door of a vehicle when the vehicle is connected to a building, and may thus increase passenger convenience in entering and exiting the vehicle and passenger convenience in movement between the vehicle and the building.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle body frame comprising:
   a lower frame fixed to a floor of a vehicle to define a lower region of an internal space in the vehicle;
   a roof frame connected to an upper portion of the lower frame to define an upper region of the internal space, and configured to slide in a vertical direction of the vehicle with respect to the lower frame, to expand the internal space in a first direction when the roof frame slides in the first direction;
   a lower door frame forming a lower portion of a vehicle door; and
   an upper door frame connected to the lower door frame to form an upper portion of the vehicle door, and configured to slide together with the roof frame to expand the vehicle door in the first direction when the roof frame slides in the first direction.

2. The vehicle body frame of claim 1, wherein the roof frame is slidably inserted in the lower frame to reduce the internal space, when the roof frame slides in a second direction.

3. The vehicle body frame of claim 1, wherein the upper door frame is slidably inserted into the lower frame to reduce the internal space, when the upper door frame slides in a second direction.

4. The vehicle body frame of claim 1, wherein the lower door frame and the upper door frame are provided on a side surface of the vehicle.

5. The vehicle body frame of claim 1, further including:
   an external door portion forming an external surface of the vehicle door, and provided outside the lower door frame and the upper door frame; and
   an internal door portion forming an internal surface of the vehicle door, and provided to surround the lower door frame and the upper door frame, wherein the external door portion and the internal door portion are spaced from each other by a predetermined interval in a width direction of the vehicle.

6. The vehicle body frame of claim 5, wherein the external door portion is elevated in a fixed state of the internal door portion, when the roof frame and the upper door frame slide in the first direction.

7. The vehicle body frame of claim 6, wherein the internal door portion is exposed outside and thus forms the external surface of the vehicle door, when the external door portion is elevated.

8. The vehicle body frame of claim 5, wherein the lower frame is connected to the internal door portion through hinges.

9. The vehicle body frame of claim 8, wherein the hinges are formed to extend while being bent in an inward direction of the vehicle.

10. The vehicle body frame of claim 5, wherein the roof frame includes a plurality of operating rails fixed to a roof rail, and wherein the external door portion is coupled to at least one of the operating rails.

11. The vehicle body frame of claim 5, further including a side glass provided beside the external door portion to form the external surface of the vehicle, wherein the side glass is connected to the roof frame in the upper region of the internal space.

12. The vehicle body frame of claim 11, wherein the lower frame includes a plurality of fixed rails fixed to the floor of the vehicle, and wherein the fixed rails are coupled to the side glass.

13. The vehicle body frame of claim 5, wherein the lower frame includes a plurality of fixed rails fixed to the floor of the vehicle, wherein the roof frame includes a plurality of operating rails fixed to a roof rail and sliding in the fixed rails, wherein the lower frame is connected to the lower door frame by hinges, and when the lower door frame is coupled to the internal door portion, the hinges connect the fixed rails to the internal door portion to fix the fixed rails and the internal door portion to each other.

14. The vehicle body frame of claim 5, wherein a gap between the internal door portion and the floor in the lower region of the internal space is sealed by a weather strip.

15. The vehicle body frame of claim 5, wherein a gap between the roof frame and the external door portion in the upper region of the internal space is sealed by a weather strip.

16. The vehicle body frame of claim 1, wherein the roof frame is connected to the upper door frame by hinges to slide together with the upper door frame.

17. The vehicle body frame of claim 1, wherein the lower frame is connected to the lower door frame by hinges.

18. The vehicle body frame of claim 5, wherein the lower door frame is connected to the internal door portion by welding.

19. The vehicle body frame of claim 1, further including:

a bidirectional hydraulic cylinder inserted into a lower end portion of the lower frame, wherein the bidirectional hydraulic cylinder slides the roof frame in the vertical direction with respect to the lower frame.

20. The vehicle body frame of claim 1, further including:

wherein the lower frame includes a plurality of fixed rails fixed to the floor of the vehicle, and wherein the roof frame includes a plurality of operating rails fixed to a roof rail and sliding in the fixed rails.

\* \* \* \* \*